Jan. 1, 1929.  1,697,136
J. R. OISHEI
WINDSHIELD CLEANER
Filed April 5, 1926
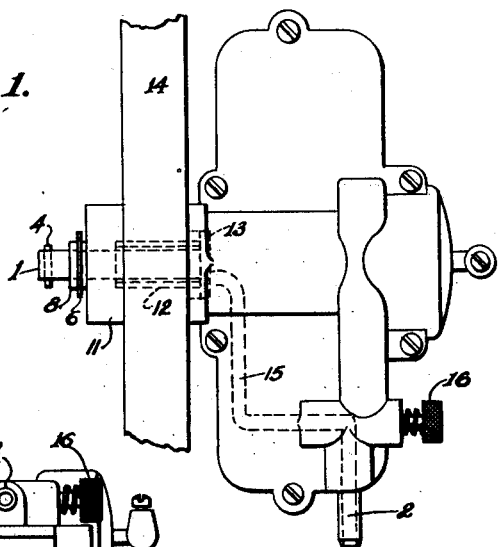
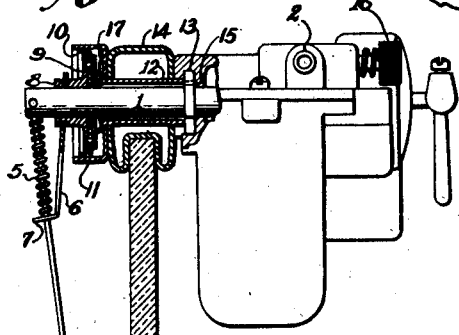
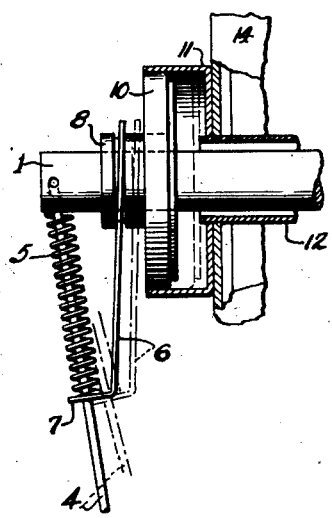
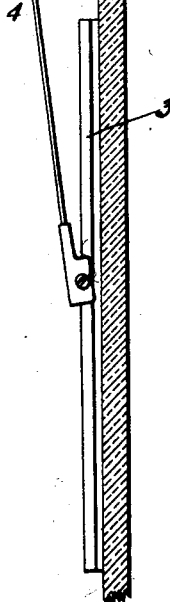
Inventor
John R. Oishei
by Barton A. Beanj
Atty.

Patented Jan. 1, 1929.

1,697,136

UNITED STATES PATENT OFFICE.

JOHN R. OISHEI, OF BUFFALO, NEW YORK, ASSIGNOR TO TRICO PRODUCTS CORPORATION, OF BUFFALO, NEW YORK.

WINDSHIELD CLEANER.

Application filed April 5, 1926. Serial No. 99,685.

This invention relates to automatic windshield cleaners. Heretofore in automatic cleaners of the air pressure or suction operated types, there has been present a lack of uniformity of operation or speed on the part of the wiper member, due to the fact that the pressures available for operating purposes vary and also by reason of variations in the pressure of the wiping strip or the like on the glass. When the wiper strip is held against the glass with considerable constant tension under low pressure operating conditions, the wiper is moved at a slower speed than normally and in some cases comes to a stop. In cases of relatively light pressure of the wiper strip on the glass too high a speed is obtained when the operating pressures are relatively great.

This invention contemplates an automatic regulation of the pressure of the wiper member on the windshield glass in accord with the power available or being used to operate the motor of the windshield cleaner. Further, in the past practice, when a windshield cleaner has been installed and the wiper strip is maintained against the glass at a given pressure, in some instances this pressure has not been the sufficient or proper pressure necessary to effect a complete cleaning of the windshield glass. In this connection, the conditions of the surface to be cleaned vary, as, for example, from a condition of practically dry glass to a glass wet with rain, to a grit or dust covered glass, wet or partially wet, or to a glass which is covered with some frozen or congealed material. In the structures heretofore used there has been no provision for taking care of these conditions.

The objects of the present invention are to provide a windshield cleaner in which the position of the wiper strip or its parts relative to the glass to be cleaned may be readily changed to accommodate the different conditions existing on the windshield glass; also to provide a windshield cleaner in which the wiping strip is held at all times in proper and efficient wiping contact with the glass during wiping movements; also to provide a windshield cleaner in which the pressure of the wiping strip upon the wiper glass is varied in accordance with the amount of power being utilized to actuate the windshield cleaner; also to provide a windshield cleaner in which the pressure of the wiping strip on the windshield glass is varied automatically in accordance with the power being used to actuate the windshield cleaner; also to provide an automatic windshield cleaner which will operate at a constant and uniform speed; and also to provide an automatic windshield cleaner which will operate on a very small amount of power.

In the drawings:

Fig. 1 is a top plan view of a windshield cleaner constructed in accordance with the present invention, the same being shown mounted on a windshield which is shown in fragment.

Fig. 2 is a side elevation of the windshield cleaner with portions shown in section to more clearly illustrate the invention.

Fig. 3 is a detailed showing on an enlarged scale, clearly depicting the mode of operation.

In the embodiment shown, the pressure of the wiping strip against the windshield glass is regulated and varied by automatically operated means. In the form illustrated this automatically operated means is actuated by the force utilized to operate the windshield cleaner and the degree of pressure exerted upon the windshield glass by the wiper strip is proportionate to the power being used for operating the device.

In the drawings there is illustrated an automatic fluid pressure, or so called suction operated windshield cleaner, having a cylinder or chamber with a vane or piston therein. This vane or piston in the form disclosed operates a rock shaft 1. Valves of any suitable type may be used for applying the operating fluid alternately to the sides of the vane or piston, as for example, as shown in my Patent No. 1,567,328, the operating pressure or suction being delivered to the suction through the primary suction passage 2, which may be connected to the intake manifold of an internal combustion engine as a source of supply.

The wiper strip 3 of the cleaner may be of any suitable type adapted to contact with the windshield glass and be moved thereon under pressure to wipe the windshield glass clean, said strip being carried by a wiper carrying arm 4, which, in turn, is secured to the outer end of the rock shaft as at 1. The wiper carrying arm illustrated is of the detachable spring pressure form, but any desired form may be used. In this form, 5 designates a spring mounted on the upper end of the wiper carrying arm, and 6 designates a pressure member engaging one end of the spring, as at 7, and having its other end pivoted at a suitable point so as to cooperate with said spring in exerting spring pressure on the wiper carrying arm. In the embodiment shown, the upper end of this spring pressure member is mounted on a portion of a bushing or sleeve 8, which is preferably slidably mounted on the rock shaft 1 and the end of this spring pressure member is adapted to be moved toward or away from the pivotal connection of the wiper carrying rod or arm to the rock shaft so as to vary the spring pressure exerted upon the wiper carrying arm and consequently upon the wiper strip. This movement of the pressure member and the consequent regulation of the pressure is preferably accomplished automatically as shown. In the preferred embodiment of this automatic regulation, there is provided a piston or movable part which is adapted to be operated on by the atmospheric air pressures and by the reduced pressure obtained through a connection with the primary suction line 2. In the form shown, the sleeve 8 is formed so as to constitute this piston or movable member, the same comprising an upstanding, annular flange 9 which is packed by means of the cup leathers 10. The outer cup leather is arranged with its flange overhanging the periphery of the flange 9, while the flange of the inner cup leather embraces the shaft 1, the cup leather flanges being arranged with their free ends facing the atmospheric side of the piston so that the cup leathers exert a variable pressure or variable fit upon the walls of the piston chamber 11 and the wiper actuating shaft 1.

This chamber 11 may be mounted as a distinct element or part, but in the present disclosure, I have shown the chamber as serving also in the capacity of a clamping nut or member for mounting the motor on the windshield. The particular mounting illustrated is what may be termed a "single hole mounting" and comprises a mounting sleeve 12, having its inner end 13 anchored to the motor casing or housing, and its outer end threaded for the reception of a clamping nut, which in the present instance is the piston chamber 11.

In mounting the motor, a single hole is drilled through the windshield frame bar 14, and the sleeve 12 passed through from the rear side, following which the chamber 11 is engaged with the protruding threaded end of said sleeve, and tightly engage against the front face of said frame bar 14, thereby firmly gripping the windshield cleaner motor to the inner side of the windshield, and with the rock shaft 1 projecting forwardly from the sleeve and chamber 11. The chamber 11 opens forwardly, and through this open end the piston 9 is introduced, so that any vacuous condition existing within the chamber would tend to draw the piston inwardly, thereby shifting the sleeve 8 with its attached link or leg 6 rearwardly from the pivotal connection of arm 4 with the rock shaft 1. This will not only act to further compress the spring 5 and thereby increase the tension acting on the wiper arm, but will also exert a pull on said wiper arm toward the windshield. In other words, the piston of the secondary or auxiliary motor 9—11 acts directly on the wiper to pull the same against the cushioning action of the spring 5.

The secondary motor is connected to the same source of operating pressure or suction, so that it will be influenced to cause the wiper to bear more or less firmly against the windshield glass in accordance with the increase or decrease of the operating pressure supplied to the main motor. This connection is illustrated in the form of a duct or passage 15, provided in the housing for the main motor, and establishing communication between the main passage 2 and the inner end of the sleeve 12. This passage may be under control of the same manual valve 16, which opens and closes communication between the source of operating pressure and the main motor.

In the operation of the device, the pressure or so-called suction in the primary passage 2 regulates the pressure of the wiper strip upon the glass as the major piston of the windshield cleaner operating motor is moving at a speed in accordance with the suction in this passage. As the windshield cleaner motor is operated by atmospheric pressure and as atmospheric pressure is the operating force for the secondary piston, it will be seen that variations in the amount of suction in the suction passage will make themselves felt in the movement of the secondary piston. Fig. 2 shows the approximate position of the parts when the windshield cleaner is operating under a small vacuum. As the vacuum increases the wiper carrying arm and the wiper strip will be automatically drawn or pulled toward the windshield glass, as has been greatly exaggerated by the dotted showing in Fig. 3. As the increased vacuum in the suction passage is exerted through the mounting sleeve and behind the secondary piston 9, the secondary piston moves inwardly, thereby moving the pressure applying member or leg 6 of the spring tensioning device for the wiper to further compress the spring 5 on the wiper arm, which in turn exerts greater spring pressure against the wiper carrying arm and greater spring pressure of the wiper strip on the glass. This increased pressure of the wiper strip on the glass requires, of course, greater power to move the wiper strip and consequently with this automatic regulation, the pressure being increased as the power for operation is increased, a substantially uniform speed of operation is had at all times.

It will thus be seen that the wiper will be urged against the windshield glass with greater or lesser pressure, according to the power available, so that on a low power supply the wiper will act against the glass with a light pressure, and as the power supply increases, the wiping contact of the wiper on the glass will also increase, not only producing a better cleaning action, but offering greater resistance to the motor, whereby any increased speed of operation will be resisted. Consequently greater uniformity in the operation of the motor would be obtained, and the usefulness and utility of the cleaner as such greatly enhanced.

In practically all, if not all of the windshield cleaners heretofore in use, the rubber of the wiping strip is held against the windshield glass with a constant pressure during the time the wiping strip is idle or is not being used to wipe the windshield glass, as well as during the time the wiping strip is wiping the glass. If the resilient pressure of the rubber wiping strip on the glass is sufficient for effective cleaning of the glass, this means that the rubber wiping strip is being pressed against the glass or a portion of the windshield frame with a pressure that tends to deform the rubber strip and which, together with the effect of the atmospheric and weather conditions on the rubber, does deform the rubber strip during its idle or non-working time which may be stated conservatively as approximately ninety-nine percent of the time, as it is estimated that these wipers are in actual operation on an average of less than one percent of the day. In the embodiment of the invention shown, where the secondary piston or plunger 9 is movable to regulate the pressure of the wiper on the glass it will be seen that when operation of the windshield cleaning motor is stopped by cutting off the suction applied to the motor through suction passage 2, the plunger 9 is free to move and does move to a position where the smallest pressure possible with the arrangement and proportions of the spring and arm and arm carrying sleeve obtains. This relieves the pressure of the wiper strip on the glass so that the device can be readily constructed so that when operation of the windshield cleaner motor is stopped the plunger moving outwardly relieves the spring pressure to the extent that there is practically no pressure of the rubber wiper strip against the glass and so that the rubber wiping strip will not be deformed by such pressure, whereby during the idle time of the device there is no destructive or deforming pressure on the rubber wiping strip. When operation of the device is started, if the power available for operation at the start is small the rubber wiping strip will be placed against the glass with that small degree of pressure that is proportional with the power available at that time and as more power becomes available or builds up the rubber wiping strip is pressed increasingly harder against the glass to effect proper wiping.

An auxiliary spring may be inserted between the piston 9 and the closed end of chamber 11, as indicated at 17 in Fig. 2, to assist in returning the piston to normal position and to relieve the wiper from pressure against the glass, or even space it from the glass, when the cleaner motor is at rest, said auxiliary spring having been omitted from Fig. 3 for the sake of clearness.

I claim as my invention:

1. In a windshield cleaner, the combination of a wiper member mounted to be moved toward and from the windshield glass to clean the same, an operating motor, a connection between said motor and said wiper member, and means controlled by the forces applied in said motor and connected with said wiper member to urge the same against the glass for automatically regulating and varying the pressure of said wiper member against the windshield glass in accord with the operating power applied to said motor.

2. In a windshield cleaner, the combination of a wiper member mounted to be moved toward and from the windshield glass to clean the same, an operating motor, a connection between said motor and said wiper member, means for resiliently pressing the wiper member against the windshield glass, and means operating upon the wiper member for automatically increasing and decreasing the resilient pressure applied to said wiper member proportionate to the increase and decrease in the operating power applied to said motor.

3. In a windshield cleaner, the combination of a wiper member mounted to resiliently contact with and be moved on a windshield glass to clean the same, a fluid pressure operated motor for operating said wiper member and fluid pressure operated means connected to the suction passage of the motor and operating on said wiper member to increase the wiping contact of the wiper member on the glass as the motor tends to increase its speed by the increased application of power thereto.

4. In a windshield cleaner, a wiper member suction operated motor operable from a variable source of suction for moving the wiper member over the windshield glass, and fluid pressure means carried by the motor and connected to the suction passage thereof for adjusting the wiper member relative to the windshield glass to vary its wiping contact therewith in proportion to the available supply of suction.

5. In a windshield cleaner, a motor having a wiper operating shaft, a wiper carried by the shaft for being moved thereby over the glass of a windshield, resilient means normally urging the wiper toward the windshield glass, a fluid pressure chamber arranged adjacent the wiper, a member movable back and forth in the chamber, and a connection between said member and said wiper and operable by said member for augmenting the resilient means in urging the wiper toward the windshield glass during the operation of the motor.

6. In a windshield cleaner, a fluid pressure motor having a wiper actuating shaft, a wiper carried by the shaft and adapted to be moved into firmer contact with the windshield glass, and a secondary fluid pressure motor connected to the wiper for urging the latter against the windshield glass during the operation of the first motor.

7. In a windshield cleaner, a fluid pressure motor having a wiper actuating shaft, a wiper, an actuating arm for the wiper carried by the shaft and adapted to be moved to bring the wiper into more or less firm contact with the windshield glass, a cylinder connected to the source of operating pressure for said motor, a piston operable in the cylinder, and a connection between said piston and said actuating arm whereby said piston will urge said wiper against the windshield glass according to the fluid pressure acting upon the piston.

8. In a windshield cleaner, a fluid pressure motor having a wiper actuating shaft, a wiper actuating arm operable by the shaft and pivoted thereto for movement toward or from the glass of a windshield, a cylinder through which the shaft extends and having communication with the source of operating pressure for the motor, a piston operable in the cylinder and slidable on the shaft, and a connection between said piston and said wiper actuating arm for pulling the latter toward the windshield glass.

9. In a windshield cleaner, a cleaner motor operable from a variable source of power, a wiper carrying arm operable thereby and adapted to have its wiper carrying portion moved toward and from the glass of a windshield to vary the wiping pressure of the wiper on the glass, and a secondary motor operable according to the supply of operating power to the cleaner motor and embodying a reciprocatory part acting upon the wiper carrying arm to vary the wiping pressure of the wiper on the glass.

10. In a windshield cleaner, a cleaner motor having an operating shaft, a wiper member connected to the shaft for actuation thereby, a sleeve slidable lengthwise of the shaft, a connection between the sleeve and wiper member for moving the latter toward or from the windshield glass according to the direction of movement of the sleeve, and a power responsive device operable by the power supplied to the motor and connected to the sleeve for moving the sleeve according to the power of the motor to lighten the wiping contact when the motor is weak and to increase the wiping contact when the motor is strong.

11. In a windshield cleaner, a cleaner motor having means for connection with a source of power, a rock shaft operable by the motor, a wiper member operable by the shaft, a secondary motor connected to said means for operation from the same source of power and having a movable element, and a connection between said movable element and said wiper member whereby the wiping contact of the latter on the windshield glass is varied according to the power available for the cleaner motor.

12. In a windshield cleaner, a fluid pressure cleaner motor having a wiper actuating shaft, a chamber arranged about the shaft and connected to the source of power for the motor whereby when the power supply is low a like condition will exist in the chamber and vice versa, a piston slidable on the shaft and operable in the chamber according to the power supply, a wiper member movable by the piston toward the windshield glass when the power supply is ample, and resilient means interposed between the piston and wiper member for transmitting the movement of the piston to said wiper member.

13. In a windshield cleaner, a cleaner motor having a wiper actuating shaft, a wiper arm pivoted to the shaft for swinging toward or from the windshield glass, a wiper carried by the arm, a spring coiled about the wiper arm, a sleeve slidable on the shaft, between the wiper arm and the motor, a stirrup slung over the sleeve to be supported thereby and having a part engaging the spring and holding it under compression whereby the wiper arm is urged toward the windshield glass, and means for moving the sleeve along the shaft to vary the wiping contact of the wiper on the windshield glass.

14. In a windshield cleaner, a cleaner motor having a wiper actuating shaft, a wiper, a wiper arm pivoted to the shaft for moving the wiper toward the windshield glass, a spring on the arm, a sleeve slidable on the shaft, a stirrup engaged at one end with the sleeve and having its opposite end engaged with the spring and holding it under tension, and means operable in proportion to the power supplied to the cleaner motor for sliding the sleeve.

15. A suction-operated windshield cleaner comprising a suction-operated cleaner motor having an operating shaft, a wiper member connected to the shaft for operation thereby, resilient means normally acting to urge the wiper member into wiping contact with the windshield glass, and a pressure responsive device operable upon an increased supply of suction to increase the resilient pressure applied by said resilient means to said wiper member.

16. In a windshield cleaner, a suction-operated motor having a rock shaft, a wiper pivotally connected to the shaft for swinging toward and from the windshield glass to be served, a single-acting suction-operated motor operatively connected to the first motor and embodying a piston, and means operable by said piston for urging the wiper toward the windshield glass upon an increase in power applied to said first motor.

17. A windshield cleaner comprising a suction-operated cleaner motor having a wiper-operating shaft, a wiper-carrying arm pivotally connected to the shaft, a coil spring encircling said arm, a stirrup engaged about the arm beneath the spring and supporting the spring under compression for urging the arm-carried wiper toward the windshield glass, and an auxiliary suction-operated motor operatively connected to the first motor and embodying a moving part movable by said auxiliary motor toward and from the pivotal connection between the arm and the shaft, said stirrup being supported by said part and movable from the pivotal connection between the arm and shaft upon an increase in power applied to said first motor.

JOHN R. OISHEI.